(12) United States Patent
Nishijima et al.

(10) Patent No.: US 7,220,129 B1
(45) Date of Patent: May 22, 2007

(54) ELECTRIC SUPPLY DEVICE FOR SLIDE STRUCTURE

(75) Inventors: Masataka Nishijima, Shizuoka (JP); Naomi Kisu, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/543,795

(22) Filed: Oct. 6, 2006

(30) Foreign Application Priority Data

Nov. 17, 2005 (JP) ............................ 2005-332464

(51) Int. Cl.
*H01R 33/00* (2006.01)
(52) U.S. Cl. ...................... 439/34; 174/72 A; 307/10.1
(58) Field of Classification Search ................. 439/34; 307/10.1; 174/72 A
See application file for complete search history.

(56) References Cited

U.S. PATENT DOCUMENTS 6,575,760 B2 * 6/2003 Doshita et al. ............... 439/34
6,811,404 B2 * 11/2004 Doshita et al. ............... 439/34
2002/0005014 A1   1/2002 Doshita et al.

FOREIGN PATENT DOCUMENTS

JP        2003-25850         1/2003

* cited by examiner

*Primary Examiner*—James R. Harvey
(74) *Attorney, Agent, or Firm*—Armstrong, Kratz, Quintos, Hanson & Brooks LLP

(57) ABSTRACT

The electric supply device for a slide structure includes: a guide rail provided on the side of the slide structure; and a slider slidably engaging with the guide rail, wherein a wiring harness is guided from the side of the slide structure to the side of a fixed structure through the slider, wherein a portion of the wiring harness on the side of the slide structure is raised up from a harness fixing part, folded back in a bent shape and introduced into the slider, so that the portion of the wiring harness effects bias force in a direction in which the slider slides.

5 Claims, 4 Drawing Sheets

ELECTRIC SUPPLY DEVICE FOR SLIDE STRUCTURE

BACKGROUND OF THE INVENTION (1) Field of the Invention

The present invention relates to an electric supply device for a slide structure, which device is mounted on the slide structure such as a slide door of a motor vehicle so as to supply electric power to an auxiliary machine of the slide structure.

(2) Description of the Related Art

FIG. 6 shows an example of a conventional electric supply device for a slide door (see Japanese Patent Application Laid-Open No. 2003-25850; FIG. 2).

The conventional electric supply device 61 for a slide door includes a laterally long case 63 provided to a slide door 62 situated on the left side of a motor vehicle, a slider 64 slidably engaging with a guide rail (not shown in the figure) in the case 63, an oscillating member 65 which is supported by a shaft perpendicular to the slider 64 and oscillates in the horizontal direction, and a caterpillar-shaped harness armored member 66 which is mounted being bent in a U-shape within the case 63 and arranged flexibly in a range from the oscillating member 65 to a vehicle body (not shown in the figure).

The harness armored member 66 is covered with a tube 67 between the slide door 62 and the vehicle body. A plurality of electric wires (i.e. wiring harness) pass through inside the harness armored member 66 and the slider 64.

When the slide door 62 is opened in a direction of an arrow A (i.e. in a rearward direction of the vehicle) from a state shown in FIG. 6, the slider 64 is relatively moved forward along the case 63 while the wiring harness 68 together with the harness armored member 66 extends in a J-shape in the case 63. The wiring harness 68 together with the harness armored member 66 extends or contracts as the slide door 62 is opened or closed, so that a slack of the wiring harness is absorbed.

However, in the conventional electric supply device 61 for a slide door, since the case 63 is arranged laterally long to the slide door 62, therefore the degree of freedom might be restricted in a layout of the other electric equipment or auxiliary machine.

For the purpose of resolving the above problem, it is considered that the case 63 is formed wide in the up-and-down direction and the wiring harness 68 is arranged being bent in a U-shape in the case 63 so as to shorten the front-and-rear length of the case 63 and the front-and-rear length of the wiring harness 68 in the case 63. However, in such a case, the slider 64 is affected by the downward pressing force due to the bending-counterforce of the wiring harness 68 and the sliding resistance of the slider 64 with respect to the guide rail is increased, thereby causing problems that the slider 64 and the guide rail are worn down due to the repeated opening and closing of the door and the sliding characteristic of the slider 64 is deteriorated especially when the slide door 62 is being opened, resulting in that the operation force required to open the slide door 62 is increased.

Moreover, for example, the electric wires are hardened when the temperature is low, causing the slider to be hardly moved, resulting in that the operation force required to move the slider is increased, that is, causing the deterioration in the opening-and-closing operation characteristic of the slide door 62.

The problems described above are not limited to the case of the slide door 62 of a motor vehicle and also occur in a case in which the conventional electric supply device 61 is applied to a slide structure such as a slide door of a vehicle except a motor vehicle or a slide door of a processing machine.

SUMMARY OF THE INVENTION

It is therefore an objective of the present invention to solve the above problems and to provide an electric supply device for a slide structure, by which even if the length of the case and the wiring harness are shortened in the sliding direction of the slide structure, the sliding resistance of the slider with respect to the guide rail can be prevented from increasing, and even if the electric wires are hardened when the temperature is low, the sliding characteristic of the slider can be prevented from deteriorating, so that the slider and the slide structure can be moved smoothly.

In order to attain the above objective, the present invention is to provide an electric supply device for a slide structure including:

a guide rail provided on the side of the slide structure; and a slider slidably engaging with the guide rail, wherein a wiring harness is guided from the side of the slide structure to the side of a fixed structure through the slider, wherein a portion of the wiring harness on the side of the slide structure is raised up from a harness fixing part, folded back in a bent shape and introduced into the slider, so that the portion of the wiring harness effects bias force in a direction in which the slider slides.

With the constitution described above, the portion of the wiring harness is resiliently biased in a direction opposite to the raising-up part of the portion of the wiring harness (which part is raised up from the harness fixing part), i.e. in the sliding direction of the slide structure with respect to a fulcrum that is the raising-up part, the bias force effects a force in the sliding direction to the slider, and the bias force does not act with respect to the direction of the slider (i.e. the direction crossing at right angles the guide rail), therefore the sliding operation characteristic of the slider is improved, so that the slide structure can be smoothly moved with small operation force in a direction opposite to the sliding direction of the slider (preferably, in the opening direction of the slide structure). Such a function effects even if the portion of the wiring harness is hardened at low temperature. The portion of the wiring harness is bent with a large radius of bend.

With the constitution described above, since pressing force does not affect the slider with respect to the guide rail, therefore the sliding operation of the slider can be carried out smoothly with small friction without wear or noise. Since the portion of the wiring harness positively biases the slider in the sliding direction of the slide structure, therefore the slide operation of the slider and the slide structure can be carried out smoothly with small force. Since such effects can be exhibited even in a case in which the portion of the wiring harness is hardened at low temperature, therefore an excellent slide operation characteristic can be always attained. Since the portion of the wiring harness is bent with a large radius, therefore bending durability of the portion of the wiring harness is improved.

Preferably, the portion of the wiring harness on the side of the slide structure is fixed to the harness fixing part on the side near to the guide rail and has a bent top part on the side far from the guide rail.

With the constitution described above, the portion of the wiring harness is raised up from the harness fixing part near to the guide rail and folded back at the top thereof (i.e. on the side far from the guide rail), and the folded portion is guided out (i.e. arranged) to the side of the fixed structure through the slider.

With the constitution described above, the portion of the wiring harness bent in a U-shape securely biases the slider in the sliding direction without pressing the slider onto the guide rail.

Preferably, the portion of the wiring harness on the side of the slide structure is received in a case, wherein the guide rail and the harness fixing part are arranged in the case.

With the constitution described above, a unit of the electric supply device consisting of the case, guide rail, harness fixing part, slider and wiring harness can be constructed. The portion of the wiring harness is protected in the case without interference with the outside.

With the constitution described above, such a unit can be easily attached to the slide structure. When the slide structure slides, the portion of the wiring harness is protected and bent with a large radius in the case, therefore bending durability of the portion of the wiring harness is improved.

Preferably, the portion of the wiring harness on the side of the slide structure is equipped with a bellows-shaped protecting tube.

With the constitution described above, the stiffness of the protecting tube makes the repulsion force of the portion of the wiring harness in the sliding direction is increased, so that the slider can be smoothly moved by small operation force with the aid of the repulsion force.

Preferably, the minimum radius of bend of the portion of the wiring harness on the side of the slide structure is restricted by a bend restricting part.

With the constitution described above, the bend restricting part greatly restricts the radius of bend of the portion of the wiring harness, thereby preventing the portion of the wiring harness from being bent largely when the slide structure is opened or closed. The bend restricting part is preferably a wall part or block part having a bent shape.

With the constitution described above, the portion of the wiring harness is prevented from being bent with a small radius of bend, so that bending durability of the portion of the wiring harness is improved. The sliding action of the slider can be smoothly securely carried out, so that the reliability of the electric supply to the slide structure can be improved.

DESCRIPTION OF THE PREFERRED EMBODIMENTS

Figure 1:
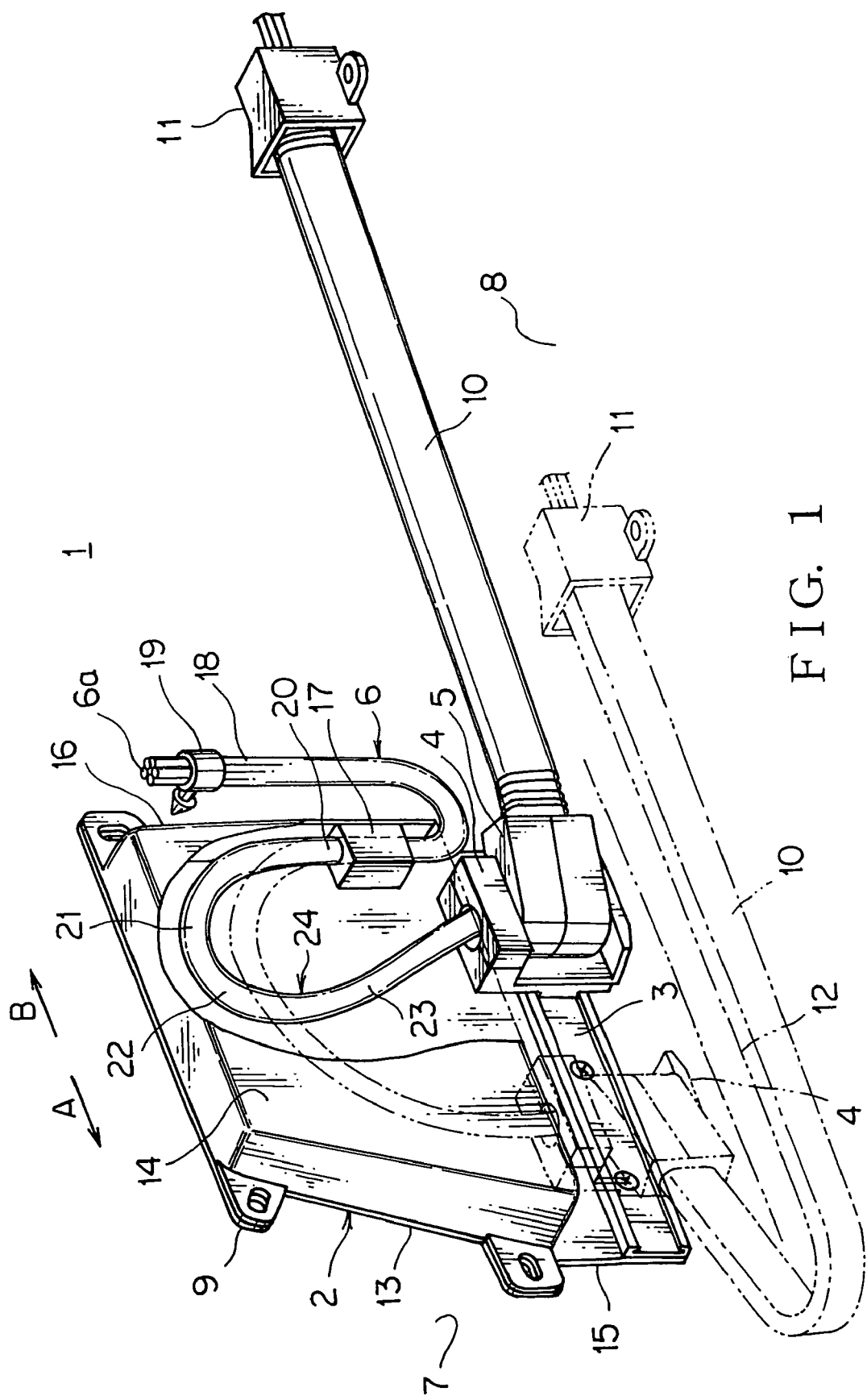
FIG. 1 is a perspective view illustrating a preferred embodiment of an electric supply device for a slide structure according to the present invention.
Figure 2:
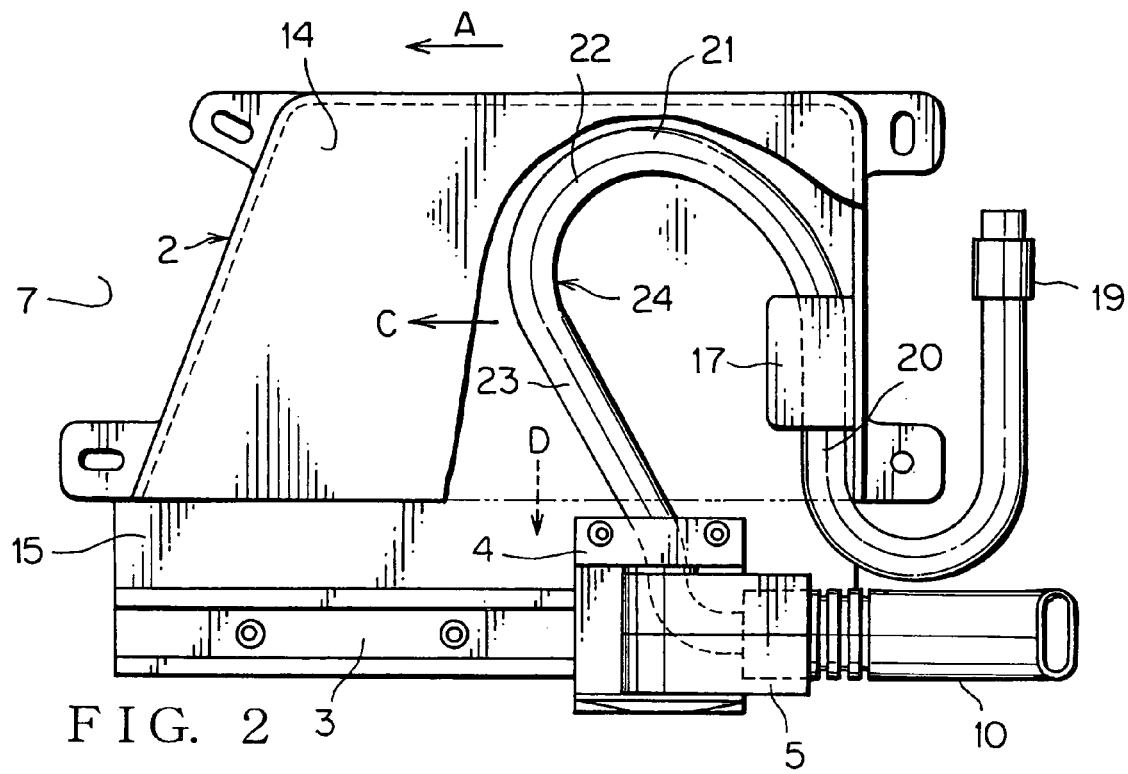
FIG. 2 is a front view illustrating an electric supply device for a slide structure when the slide structure is fully closed.
Figure 3:
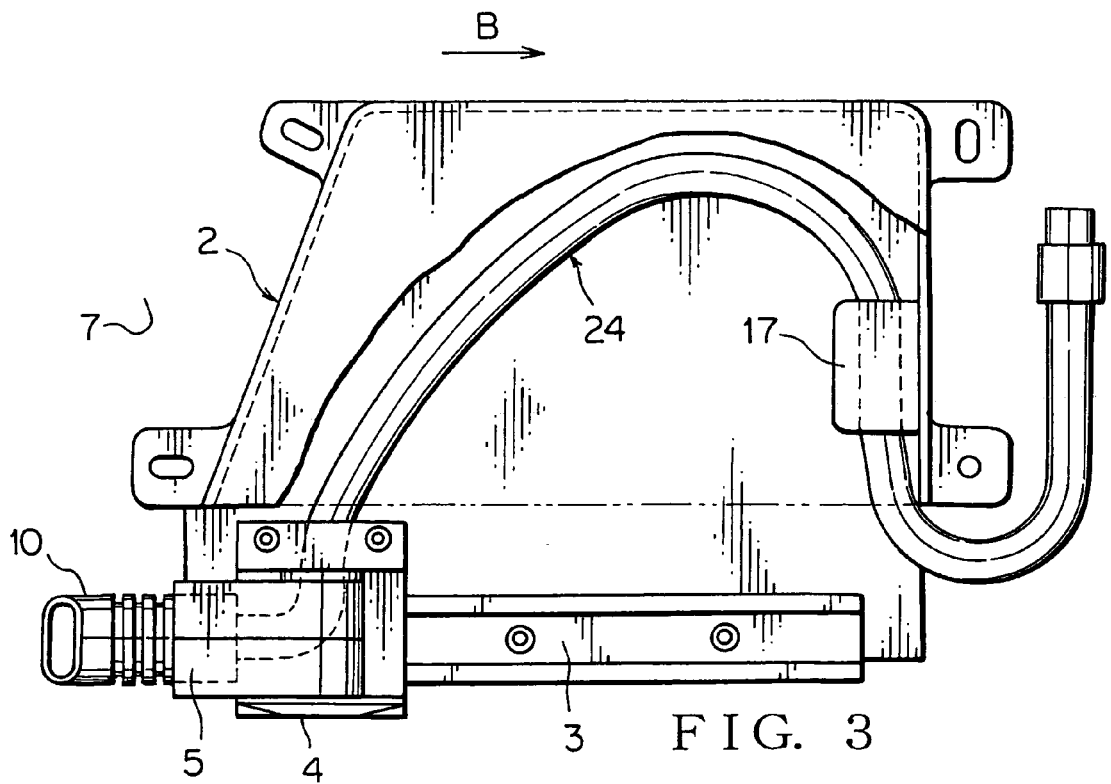
FIG. 3 is a front view illustrating an electric supply device for a slide structure when the slide structure is fully opened.

FIGS. 1–3 show a preferred embodiment of an electric supply device for a slide structure according to the present invention.

The electric supply device 1 for a slide structure includes: a rectangular case 2 made of synthetic resin; flat guide rail 3 made of metal provided at a lower part of the case 2; slider 4 made of synthetic resin slidably engaging with the guide rail 3; an oscillating member 5 provided to the slider 4, the oscillating member 5 being able to oscillate in the horizontal direction; and wiring harness 6 which is introduced into the case 2 upward from below, folded back in an arc-shape at an upper part of the case 2 and guided out to the outside passing through the slider 4 and the oscillating member 5.

In FIG. 1, the case 2 is fixed to a door inner panel made of metal of a slide door 7 situated on the right side of a vehicle with a bracket 9. A portion 10 of the wiring harness horizontally guided out to the outside from the oscillating member 5 is supported by a harness fixing tool 11 situated on the side of a vehicle body. The harness fixing tool 11 is arranged, for example, in the proximity of a step part of the vehicle body so as to guide the portion 10 of the wiring harness to the side of an electric source.

In FIG. 1, straight alternate long and two short dashes lines 12 show a boundary between the slide door 7 and the vehicle body 8. In FIG. 1, the left side is the front side of the vehicle while the right side is the rear side of the vehicle. The slide door 7 integrally with the case 2 of the electric supply device 1 slides forward in a direction of an arrow A to close and slides rearward in a direction of an arrow B to open. When the slider door 7 opens, the slide door 7 immediately leaves the vehicle body 8 to the outside.

In FIG. 1, a form of the wiring harness when the slide door is fully closed is shown by solid lines, while a form of the wiring harness when the slide door is fully opened is shown by alternate long and two short dashes lines. In fact, since the case 2 of the electric supply device 1 is advanced and retracted integrally with the slide door 7, therefore a position of the harness fixing tool 11 situated on the side of the vehicle body 8 does not change at both a time point when the slide door 7 is fully opened and a time point when the slide door 7 is fully closed.

The case 2 is composed of a base part 13 and a cover part 14, wherein the base part 13 is extended downward longer than the cover part 14, the guide rail 3 is fixed to the extended plate part 15 of the base part 13, and the guide rail 3, slider 4 and the oscillating member 5 are exposed below the cover part 14. The base part 13 and the cover part 14 are fixed to each other by a locking means, the base part 13 comes in contact with the door inner panel (7), the cover part 14 is covered with a door trim (not shown in the figure) made of synthetic resin, and an outside portion 10 of the wiring harness is guided out to the side of the vehicle body from an lower end or a slit-shaped opening (not shown in the figure) of the door trim.

The wiring harness 6 is folded back upward from an lower end of a wall part 16 situated on the rear side of the case 2, guided into the case 2, and fixed to the case 2 at a harness fixing part 17 below the wall part 16 of the rear side. Preferably, the harness fixing part 17 is a U-shaped wire or a clamp that can be divided into the left and right. A portion 18 of the wiring harness, which is folded back upward from the lower end of the case 2 and guided out to the outside of the case 2, is fixed to the door inner panel at a fixing part 19 such as a locking clip in the proximity of the rear wall 16 of the case 2 and arranged toward an auxiliary machine situated on the side of the slide door.

A portion 20 of the wiring harness raised up upward from the harness fixing part 17 within the case 2 is gently bent inwardly toward the center of the case 2 and reaches a top part (bent top part) 21, an arc-shaped bent part 22 including the top part 21 continues to a downward approximately straight portion 23, the straight portion 23 is downwardly introduced into the slider 4 from the upper part of the slider 4, bent in the horizontal direction along the oscillating member 5 situated at the middle in the height direction of the slider 4, and continues to the outside part 10 of the wiring harness.

The harness fixing part 17 is situated in the proximity of the top of the guide rail 3 and the top part 21 of the portion 24 (i.e. portions 20–23) of the wiring harness in the case 2 is parted away from the top of the guide rail 3. An upper part of the slider 4 can be divided into the left and right (i.e. in a thickness direction of the case 2), the oscillating member 5 can divided into the top and bottom. Both the upper part of the slider 4 and the oscillating member 5 pass the wiring harness 6 through their harness passing hole obtained by the division. When each of the divided upper part of the slider 4 and the divided oscillating member 5 is united, the oscillating member 5 can be rotatably supported between upper and lower walls of the slider 4.

As for the portion 24 of the wiring harness in the case 2 and the portion 18 of the wiring harness guided out from the lower end of the rear wall of the case 2, a plurality of coated wires 6a are bundled up with a bundling means (not shown in the figure) such as a vinyl tape to prevent the wires 6a from coming apart. The portion 10 of the wiring harness from the oscillating member 5 to the harness fixing tool 11 on the side of the vehicle body is covered with a corrugated tube, longer than it is wide, made of synthetic resin.

As shown in FIGS. 1 and 2, on a condition that the slide door 7 is fully closed, the portion 24 of the wiring harness in the case 2 is upwardly bent in an inverse U-shape so as to exhibit outward repulsion force, that is, repulsion force in the front-and-rear direction of the vehicle (i.e. the lateral width direction of the case 2). Since the portion 20 of the wiring harness, which rises up straight being situated on the rear side of the inverse U-shaped portion 24 of the wiring harness, is fixed along the rear wall 16 of the case 2, therefore a portion (23) of the wiring harness, which is the front side portion of the inverse U-shaped portion 24 of the wiring harness, exhibits a large repulsion force forward (i.e. a direction of an arrow C in FIG. 2).

Since there is no force to press the portion 24 of the wiring harness having an inverse U-shape in the case 2 downward, that is, there is no force to press the slider 4 downward with respect to the guide rail 3, therefore slide resistance of the slider 4 when the door is opened or closed is very small, that is, the slider 4 can securely slide smoothly with small force, thereby preventing the slider 4 and the guide rail 3 from being worn, that is, the operation characteristic of the slide door 7 is improved without increasing the required operation force.

Since the portion 23 of the wiring harness, which is the front side portion of the inverse U-shaped portion 24 of the wiring harness, exhibits a large repulsion force forward (i.e. a direction of an arrow C in FIG. 2), from a time point when the slide door 7 is closed as shown in FIG. 2 to a time point when the slide door 7 is opened as shown in FIG. 3, the slider 4 is pushed forward by the repulsion force of the inverse U-shaped portion 24 of the wiring harness, the forward sliding force of the slider 4 is encouraged, the slide movement of the slider 4 is smoothly securely carried out only with a small force, and the operation force for opening the slide door 7 is reduced, thereby improving the operation characteristic for opening the slide door 7. Since the sliding characteristic of the slider 4 is improved, the oscillating action of the oscillating member 5 connected to the slider 4 is securely carried out according to the opening and closing action of the slide door 7, therefore a load affecting the portion 10 of the wiring harness between the slide door 7 and the vehicle body 8 is reduced.

The effects described above is considerably effective in a case when the electric wires 6a (i.e. portion 24 of the wiring harness) are hardened at low temperature so that the sliding characteristic of the slider 4 tends to deteriorate. That is, stiffness (i.e. repulsion force) of the hardened portion 24 of the wiring harness is increased, so that the slide encouraging force is improved by pressing the slider 4 strongly in the direction of the arrow C in FIG. 2, that is, the slider 4 can be smoothly moved in the direction of the arrow C with a small operation force.

Figure 6:
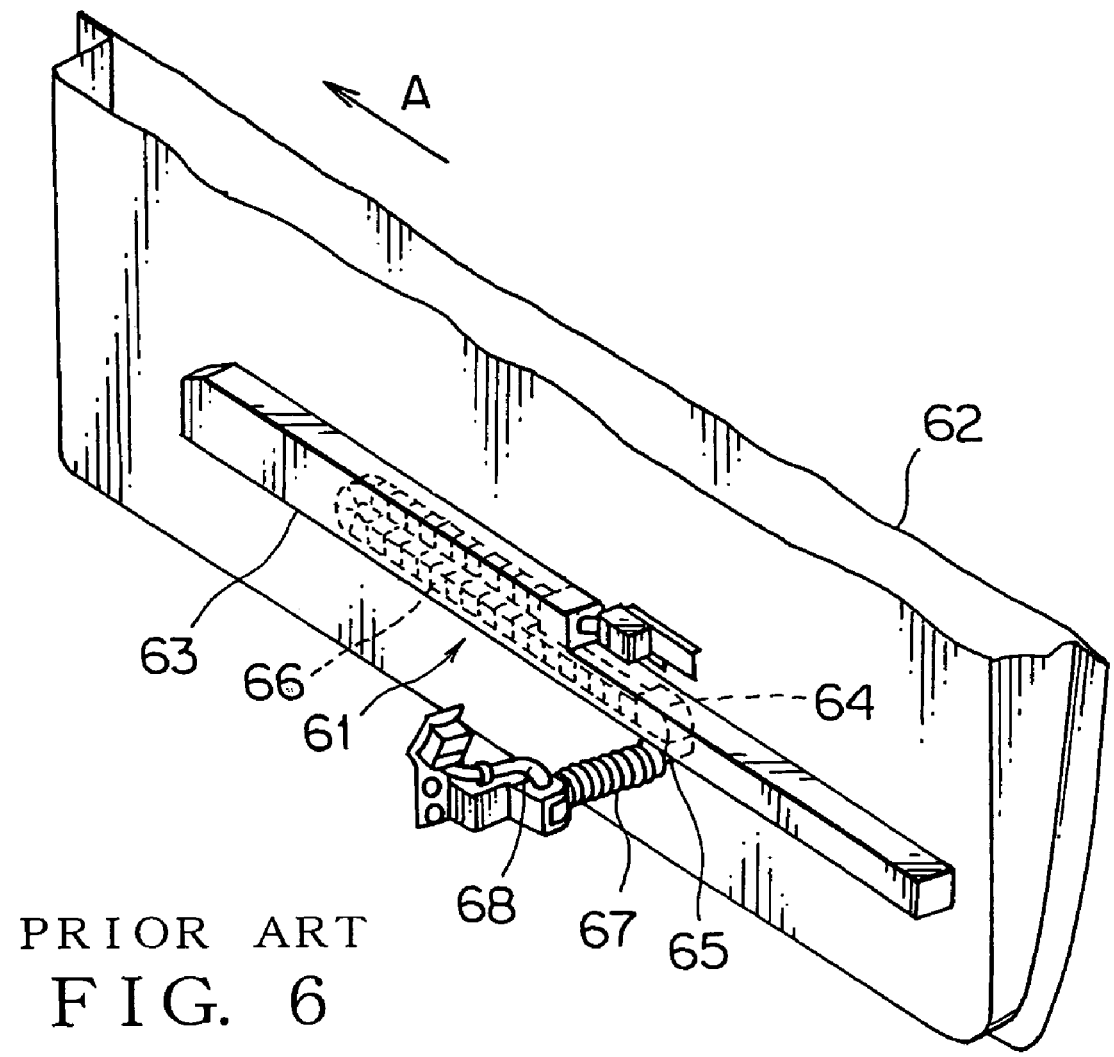
FIG. 6 is a perspective view of an example of a conventional electric supply device for a slide structure.

A wiring harness in the conventional electric supply device (FIG. 6) is arranged laterally in a U-shape and a position of a bent part at an end of the U is in turn moved in the longitudinal direction of the wiring harness. However, according the preferred embodiments of the present invention shown in FIGS. 1–3, since the portion 24 of the wiring harness is bent with a large radius of bend in a rectangular (close to square) case 2 when the slide door 7 is opened or closed, therefore bending stress applied to the wiring harness is small, so that bending durability of the wiring harness 6 is improved.

When the slide door 7 is fully closed as shown in FIGS. 1 and 2, the slider 4 is positioned at the rear end side of the guide rail 3 and the rising-up portion 23 on the side of the slider 4 approaches inwardly the portion 20 of the wiring harness on the rear side so as to be situated in an inclined shape.

The portion 10 of the wiring harness horizontally guided out from the oscillating member 5 is straightly pulled with respect to a fulcrum that is the harness fixing tool 11 on the side of the vehicle body, hardly being affected by the bending stress, and its static durability is improved in a time period when the slide door 7 is closed, said time period being considerably longer than a time period when the slide door 7 is opened. The oscillating member 5 oscillates rearward toward the harness fixing tool 11 with respect to a fulcrum that is a vertical shaft (not shown in the figure) of the slider 4.

When the slide door 7 is slid rearward (i.e. in a direction of an arrow B in FIG. 3) from a state in which the slide door 7 is fully closed as shown in FIGS. 1 and 2, as shown in FIG. 3, slider 4 is slid to the front end side of the guide rail 3 and the portion 24 of the wiring harness in the case 2 is bent in a gentle mountain-shape between the harness fixing part 17 on the side of the rear wall and the slider 4. The portion 10 of the wiring harness, which is passed through the slider 4 and guided out to the outside from the oscillating member 5, heads forward as shown by the alternate long and two short dashes lines in FIG. 1 being bent (i.e. being folded) rearward and continues approximately straight to the harness fixing tool 11 situated on the side of the vehicle body. The oscillating member 5 oscillates forward with respect to a fulcrum that is a vertical shaft (not shown in the figure) of the slider 4.

In FIG. 1, the harness fixing tool 11 maintains its position unchanged when the slide door 7 is opened and closed. The advancing action of the slider 4 is encouraged by the forward repulsion force of the portion 24 of the wiring harness in the case 2 and no downward pressing force is applied to the slider 4.

When the slide door 7 is slid rearward from a state, in which the slide door 7 is fully opened as shown in FIG. 3, so as to be switched to a state in which the slide door 7 is fully closed as shown in FIG. 2, the portion 24 of the wiring harness in the case 2 is affected only by compressive force in the front-and-rear direction and not affected by downward pressing force. Therefore, the sliding resistance of the slider 4 is reduced and therefore, the closing operation of the slide door 7 can be carried out smoothly with a small force. When the closing operation of the slide door 7 is driven by a motor, the energy consumption of the motor can be reduced.

In FIG. 3, the retracting action of the slider 4 is carried out against the repulsion force of the portion 24 of the wiring harness in the case 2. Since the portion 24 of the wiring harness is bent gently in an upward mountain-shape when the slide door 7 is fully opened, therefore the repulsion force upon fully opening of the slide door 7, that is, force that initially compresses the portion 24 of the wiring harness in the front-and-rear direction is small, therefore force required to move the slider 4 rearward initially is small, that is, the closing operation of the slide door 7 can be maintained excellent substantially.

Figure 4:
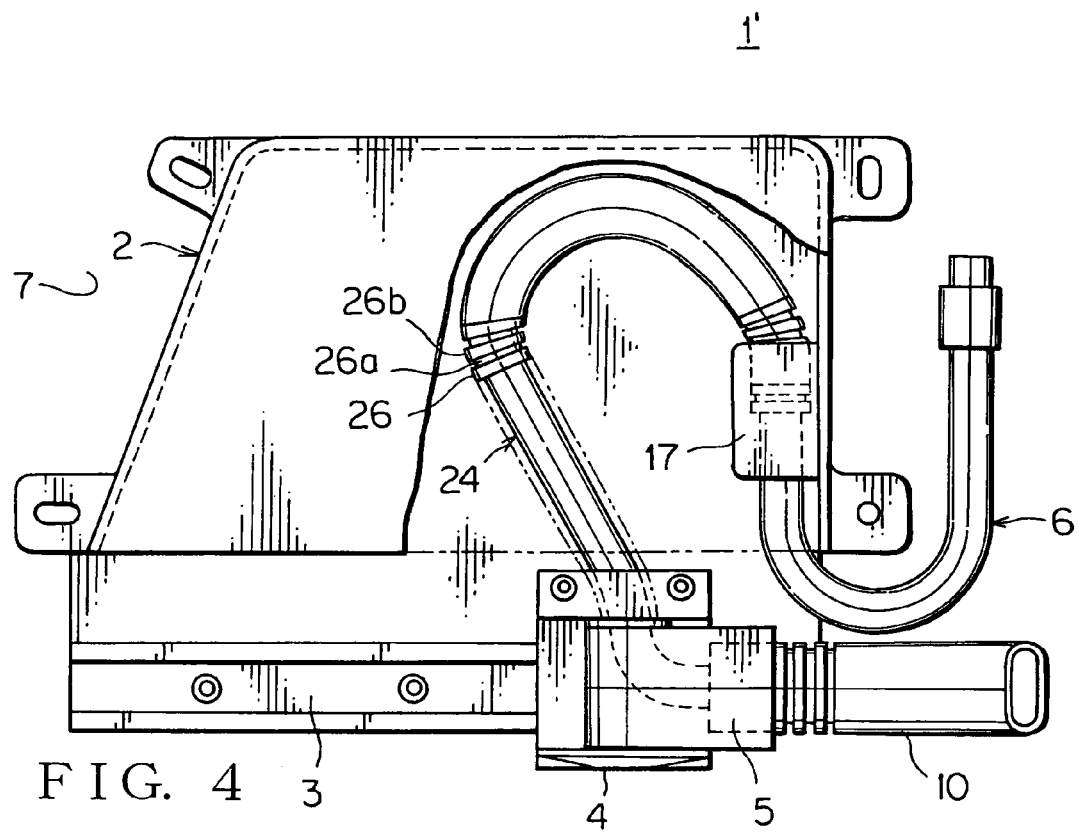
FIG. 4 is a front view illustrating another preferred embodiment of an electric supply device for a slide structure.

FIG. 4 shows another preferred embodiment of an electric supply device 1' for a slide structure of the present invention, in which a known corrugated tube 26 that is a protecting tube made of synthetic resin is mounted on an outer circumference of the wiring harness 6.

The corrugated tube 26 is a tube in which hollow grooves 26a and projecting strips 26b in the circumferential direction are alternately arranged in a bellows-shape in the longitudinal direction of the tube and has excellent bending property and some repulsion force (i.e. stiffness) in the bending direction. By the repulsion force of the corrugated tube 26, force that the portion 24 of the wiring harness in the case 2 presses the slider 4 forward is increased when the slide door 7 is fully closed, therefore the operation characteristic of the slider 4 upon opening operation of the slide door 7 and the opening operation characteristic of the slide door 7 are improved further.

The corrugated tube 26 is mounted in a range between the harness fixing part 17 and the slider 4 in the case 2. Fixing of the corrugated tube 26 to the harness fixing part 17 and the slider 4 is carried out easily in such a way that for example, the harness fixing part 17 and the slider 4 each is made in a division-type in the left-and-right direction (i.e. in the thickness direction of the case 2) and an inner circumference of each of a division-type harness-passing hole of the harness fixing part 17 and the slider 4 is provided with a rib (not shown in the figure) engaging with the hollow groove 26a of the corrugated tube 26. That is, an end of the corrugated tube 26 is mounted to the divided groove-shaped harness-passing hole and the divided harness-passing holes situated left and right are united so as to hold the corrugated tube.

The corrugated tube 26 in the case 2 may be circular in its section. However, if the corrugated tube 26 is ellipse-shape or flat shape in its section and is arranged in such a way that the thickness direction of the case 2 coincides with a short diameter direction of the corrugated tube 26, the case 2 can be thin and the repulsion force of the portion 24 of the wiring harness upon fully closing of the slide door 7 (FIG. 4) can be increased further.

A bellows-shaped protecting tube having relatively high stiffness may be used instead of the corrugated tube 26. A thick protecting tube made of synthetic resin having relatively high stiffness (i.e. relatively high repulsion) without having a bellows-shape may be used instead of the corrugated tube 26.

Figure 5:
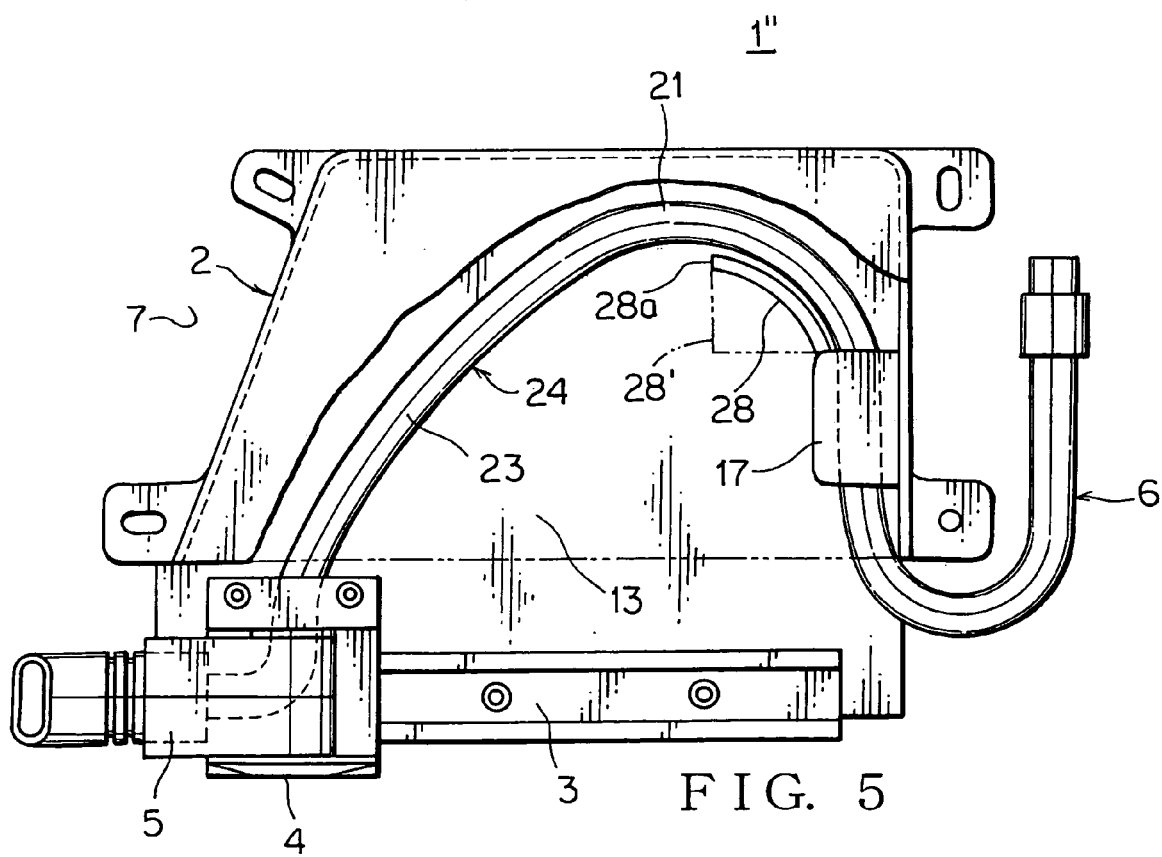
FIG. 5 is a front view illustrating further preferred embodiment of an electric supply device for a slide structure.

FIG. 5 shows a further preferred embodiment of an electric supply device 1'' for a slide structure of the present invention, in which there is provided in the case 2 a bend-restricting part for restricting largely to some extent the minimum radius of bend of the wiring harness. To restrict the minimum radius of bend means to make the radius of bend have a value which does not cause the wiring harness to be affected by excessive bending stress.

In an example shown in FIG. 5, the bend-restricting part 28 is a wall part having a bent plate (i.e. an arc plate) and may be formed integrally on a perpendicular board of the base part 13 of the case 2 made of synthetic resin or formed integrally on the harness fixing part 17 made of synthetic resin situated on the rear side of the case 2, or fixed to the harness fixing part 17 by means of insertion or engagement (for example, a hollow groove of the bend-restricting part 28 being engaged with the rib for holding the corrugated tube of the harness fixing part).

Preferably, a position of an end 28a of the bend-restricting part 28 is directly below the top part 21 of the portion 24 of the wiring harness in the case 2. The straight portion 23 of the wiring harness oscillates forward and rearward in the case 2 with respect to a fulcrum that is the end 28a of the bend-restricting part 28 as the slider 4 advances and retracts.

Instead of the plate-shaped wall part 28, the bend-restricting part 28 may be formed in such a way that a block-shaped 28' having a bent surface for supporting the wiring harness may be formed integrally or separately on the base wall 13 of the case 2 as shown by alternate long and two short dashes lines.

In an example shown in FIG. 5, as for the portion 24 of the wiring harness in the case 2, a plurality of coated wires 6a are bundled up with a bundling means such as a tape. However, instead, as shown in FIG. 4, the portion 24 of the wiring harness in the case 2 is equipped with a protecting tube such as a corrugated tube 26 and the protecting tube may be supported by the bend-restricting part 28.

As for the electric supply device 1-1'' according to the preferred embodiments described above, the case 2 is used to receive and protect the wiring harness 6. However, instead, without using the case 2, for example, the door inner panel or the door trim may be provided with a case-shaped concave part (not shown in the figure) so that the flat guide rail 3 and the rear harness fixing part 17 are provided in the concave part. Alternatively, even such a concave part may be omitted, and the flat guide rail 3 and the rear harness fixing part 17 may be directly fixed to the door inner panel or the door trim.

In the preferred embodiments described above, the slider 4 is provided with the oscillating member 5. However, instead, for example, without using the oscillating member 5, the portion 10 of the wiring harness may be directly guided out from the slider 4 to the side of the vehicle body in such a manner that the portion 10 can oscillate. In this case, the vertical portion of the wiring harness 6 is twisted in the circumferential direction at the slider 4 so that the opening and closing action of the slide door 7 is absorbed.

(In an example shown in FIG. 1, the vertical portion of the wiring harness 6 is twisted in the circumferential direction integrally with the oscillating member 5.

In the preferred embodiments described above, the portion 10 of the wiring harness guided out from the slider 4 to the outside can oscillate with respect to a fulcrum that is the side of the vehicle body. However, instead, for example, a harness winding-up reel (not shown in the figure) may be provided on the side of the vehicle body so that the portion 10 of the wiring harness is wound up without being bent or sent out directly from the reel as shown by alternate long and two short dashes lines in FIG. 1 as the slider door 7 is opened and closed. Thus, a manner how a slack of the portion 10 of the wiring harness from the slider 4 to the vehicle body 8 is absorbed is appropriately determined according to a need.

In the preferred embodiments described above, the examples of the electric supply device, which is matched with the right slide door 7 of the vehicle. However, of course, an electric supply device, which is matched with the left slide door 7 of the vehicle, can be adopted. The electric supply device can be symmetrically placed in the width direction of the vehicle (i.e. the thickness direction of the case 2) when the device is placed either on the left or right side.

In the preferred embodiments described above, the slide door 7 is slid rearward to be opened and slid forward to be closed. However, instead, the slide door 7 is slid forward to be opened and slid rearward to be closed. In the latter case, of course, "front" is replaced by "rear" and "rear" is replaced by "front" in the explanations shown with reference to FIGS. 1–5. In the preferred embodiments described above, the guide rail 3 is arranged below the case 2. However, instead, the case 2 shown in FIGS. 1–5 may be arranged upside down, that is, the guide rail 3 may be arranged above the case 2.

In the preferred embodiments described above, the samples in which the electric supply device 1-1" is mounted on the slide door 7 of the motor vehicle, are shown. However, the electric supply device according to the preferred embodiments described above can be applied to a slide structure such as a slide door of a vehicle except a motor vehicle or a slide door of a processing machine except a vehicle. When the slide door 7 is called a slide structure, the vehicle body 8 or a body of the processing machine is called a fixed structure.

The constitution of the electric supply device for a slide structure according to the preferred embodiments described above is also effective in an electric supply structure for a slide structure or in an arrangement structure of a wiring harness.

The aforementioned preferred embodiments are described to aid in understanding the present invention and variations may be made by one skilled in the art without departing from the spirit and scope of the present invention.

What is claimed is:

1. An electric supply device for a slide structure comprising:
    a guide rail provided on the side of the slide structure; and
    a slider slidably engaging with the guide rail,
wherein a wiring harness is guided from the side of the slide structure to the side of a fixed structure through the slider,
wherein a portion of the wiring harness on the side of the slide structure is raised up from a harness fixing part, folded back in a bent shape and introduced into the slider, so that the portion of the wiring harness effects bias force in a direction in which the slider slides.

2. The device according to claim 1, wherein the portion of the wiring harness on the side of the slide structure is fixed to the harness fixing part on the side near to the guide rail and has a bent top part on the side far from the guide rail.

3. The device according to claim 1, wherein the portion of the wiring harness on the side of the slide structure is received in a case, wherein the guide rail and the harness fixing part are arranged in the case.

4. The device according to claim 1, wherein the portion of the wiring harness on the side of the slide structure is equipped with a bellows-shaped protecting tube.

5. The device according to claim 1, wherein the minimum radius of bend of the portion of the wiring harness on the side of the slide structure is restricted by a bend restricting part.

* * * * *